United States Patent
Kaneko

(10) Patent No.: US 8,349,206 B2
(45) Date of Patent: Jan. 8, 2013

(54) PROCESS FOR LUBRICATING A REFRIGERATOR CONTAINING SLIDING PARTS MADE OF AN ENGINEERING PLASTIC MATERIAL

(75) Inventor: Masato Kaneko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/030,233

(22) Filed: Feb. 18, 2011

(65) Prior Publication Data

US 2011/0136712 A1 Jun. 9, 2011

Related U.S. Application Data

(63) Continuation of application No. 12/817,316, filed on Jun. 17, 2010, now abandoned, which is a continuation of application No. 11/913,108, filed on Oct. 30, 2007, now Pat. No. 7,824,567.

(30) Foreign Application Priority Data

Aug. 31, 2005 (JP) ................................. 2005-252642

(51) Int. Cl.
C09K 5/04 (2006.01)
C10M 107/34 (2006.01)

(52) U.S. Cl. ................. 252/68; 62/84; 62/468; 508/579

(58) Field of Classification Search .................... 252/68; 62/84, 468; 508/579
See application file for complete search history.

(56) References Cited

U.S. PATENT DOCUMENTS

| | | | |
|---|---|---|---|
| 5,295,357 A | 3/1994 | Kaneko | |
| 5,310,492 A | 5/1994 | Seiki et al. | |
| 5,403,503 A | 4/1995 | Seiki et al. | |
| 5,801,132 A | 9/1998 | Kaneko et al. | |
| 5,858,266 A | 1/1999 | Kaneko | |
| 5,997,761 A | 12/1999 | Kaneko | |
| 6,074,573 A | 6/2000 | Kaneko | |
| 6,189,322 B1 | 2/2001 | Ishihara et al. | |
| 6,193,906 B1 | 2/2001 | Kaneko et al. | |
| 6,261,474 B1 | 7/2001 | Egawa et al. | |
| 6,584,783 B2 | 7/2003 | Gopalnarayanan et al. | |
| 7,824,567 B2 * | 11/2010 | Kaneko ........................... | 252/68 |
| 2007/0272893 A1 | 11/2007 | Kaneko | |
| 2007/0290164 A1 | 12/2007 | Kaneko | |
| 2008/0108850 A1 | 5/2008 | Nagao et al. | |
| 2009/0000331 A1 | 1/2009 | Nagao et al. | |
| 2009/0062167 A1 | 3/2009 | Kaneko | |
| 2009/0072187 A1 | 3/2009 | Kaneko | |
| 2009/0082237 A1 | 3/2009 | Kaneko | |
| 2009/0090128 A1 | 4/2009 | Kaneko | |
| 2009/0159836 A1 | 6/2009 | Kaneko | |
| 2009/0270295 A1 | 10/2009 | Kaneko | |
| 2009/0277212 A1 | 11/2009 | Kaneko et al. | |
| 2010/0147016 A1 | 6/2010 | Kaneko et al. | |
| 2010/0175421 A1 | 7/2010 | Kaneko et al. | |
| 2010/0252772 A1 * | 10/2010 | Kaneko ........................... | 252/68 |
| 2010/0252773 A1 * | 10/2010 | Kaneko ........................... | 252/68 |

FOREIGN PATENT DOCUMENTS

| | | |
|---|---|---|
| CN | 1370218 A | 9/2002 |
| JP | 3 28296 | 2/1991 |
| JP | 08 135585 | 5/1996 |
| JP | 08 193196 | 7/1996 |
| JP | 09 235577 | 9/1997 |
| JP | 10 147682 | 6/1998 |
| JP | 11 106775 | 4/1999 |
| JP | 11 124590 | 5/1999 |
| JP | 2000 274360 | 10/2000 |
| JP | 2001 107066 | 4/2001 |
| JP | 2001 294886 | 10/2001 |
| WO | WO 2006022023 A1 | 3/2006 |

OTHER PUBLICATIONS

Reg. No. 25104-37-4, Nov. 16, 1984.
Reg. No. 24991-61-5, Nov. 16, 1984.
Reg. No. 9003-13-8, Nov. 16, 1984.
Office Action issued Sep. 21, 2010, in China Patent Application No. 200680030895.7 (with English translation).
U.S. Appl. No. 13/210,663, filed Aug. 16, 2011, Kaneko.
U.S. Appl. No. 13/315,845, filed Dec. 9, 2011, Kaneko.
Taiwanese Office Action issued Aug. 20, 2012, in Taiwan Patent Application No. 095132054.

* cited by examiner

*Primary Examiner* — Douglas McGinty

(74) *Attorney, Agent, or Firm* — Oblon, Spivak, McClelland, Maier & Neustadt, L.L.P.

(57) ABSTRACT

A process to lubricate a refrigerator preferably having a sliding portion which is made of an engineering plastic material, or provided thereon with an organic coating film or an inorganic coating film is provided. The process includes contacting sliding parts of the refrigerator with a refrigerating machine oil composition having a base oil containing a polyvinyl ether and/or a polyoxyalkylene glycol derivative as a main component and having a kinematic viscosity of 1 to 8 $mm^2/s$ as measured at 40° C. The refrigerating machine oil composition has a low viscosity, an improved energy saving performance, a good sealability and an excellent compatibility with a refrigerant and, therefore, the process can be suitably used in various refrigerating application fields, in particular, in closed-system refrigerators.

12 Claims, No Drawings

PROCESS FOR LUBRICATING A REFRIGERATOR CONTAINING SLIDING PARTS MADE OF AN ENGINEERING PLASTIC MATERIAL

CROSS REFERENCE TO RELATED APPLICATIONS

This application is a continuation application prior U.S. patent application Ser. No. 12/817,316, filed Jun. 17, 2010, now abandoned, the disclosure of which is incorporated herein by reference in its entirety. The parent application is a continuation application of prior U.S. patent application Ser. No. 11/913,108, filed Oct. 30, 2007, issued as U.S. Pat. No. 7,824,567 on Nov. 2, 2010, the disclosure of which is incorporated herein by reference in its entirety. The parent application is the national stage of PCT/JP06/316864, filed Aug. 28, 2006, the disclosure of which is incorporated herein by reference in its entirety. The parent application claims priority to Japanese Application No. 2005 252642 filed Aug. 31, 2005, the disclosure of which is incorporated herein by reference in its entirety.

BACKGROUND OF THE INVENTION

1. Field of the Invention

The present invention relates to refrigerating machine oil compositions, and more particularly to refrigerating machine oil compositions having a low viscosity, an improved energy saving performance, a good sealability and an excellent compatibility with a refrigerant which are suitably used in various refrigerating application fields, in particular, closed-system refrigerators.

2. Description of Related Arts

In general, compression-type refrigerators are constituted from at least a compressor, a condenser, an expansion mechanism (such as expansion valve), and an evaporator and/or a dryer, and have such a structure in which a mixed liquid composed of a refrigerant and a lubricant (refrigerating machine oil) is circulated through the closed system. In the compression-type refrigerators, in general, since an inside of the compressor is kept at a high temperature whereas an inside of the cooler is kept at a low temperature although these conditions vary depending upon kinds of refrigerators, it is required that the mixed liquid is circulated through the system without undergoing a phase separation thereof into the refrigerant and the lubricant over a wide temperature range of from the low temperature to the high temperature. The refrigerant and the lubricant in the mixed liquid generally have phase separation ranges on high-temperature and low-temperature sides, respectively. A maximum temperature in the low-temperature side phase separation range is preferably −10° C. or lower and more preferably −20° C. or lower whereas a minimum temperature in the high-temperature side phase separation range is preferably 30° C. or higher and more preferably 40° C. or higher. If the mixed liquid undergoes the phase separation during operation of the refrigerators, the life or operation efficiency of these apparatuses tends to be considerably adversely affected. For example, if the mixed liquid suffers from phase separation into the refrigerant and the lubricant in the compressor, poor lubrication occurs at a movable part thereof, resulting in defects such as seizing and, therefore, remarkably shortened life of the apparatuses. Whereas, if the phase separation occurs in the evaporator, a heat exchange efficiency of the apparatuses tends to be deteriorated owing to a high-viscous lubricant being present therein Hitherto, as the refrigerant for refrigerators, there have been mainly used chlorofluorocarbon (CFC), hydrochlorofluorocarbon (HCFC), etc. However, these compounds contain chlorine causing environmental problems. For this reason, there have been presently made studies for developing alternate refrigerants containing no chlorine such as hydrofluorocarbon (HFC). However, HFC has been reported to have adverse influence on global warming. Under these circumstances, there have been noticed so-called natural refrigerants suitable for environmental protection such as hydrocarbons, ammonia and carbon dioxide.

In addition, since the lubricant for refrigerators are used in order to lubricate movable parts thereof, it is also important that the lubricant has a good lubricating performance. In particular, since an inside of the compressor is likely to be kept at a high temperature, it is important that the lubricant has a viscosity capable of retaining an oil film required for a good lubrication. Although a necessary viscosity of the lubricant varies depending upon kinds of the compressor and use conditions thereof, the lubricant before mixing with the refrigerant preferably has a viscosity (kinematic viscosity) of 10 to 200 mm$^2$/s as measured at 40° C. It has been conventionally reported that if the viscosity of the lubricant is lower than the above specified range, a thickness of an oil film formed tends to be reduced, resulting in poor lubrication, whereas if the viscosity of the lubricant is higher than the above specified range, a heat exchange efficiency of the refrigerators tends to be lowered.

For example, there is disclosed a lubricant composition for vapor compression-type refrigerators using carbon dioxide as a refrigerant which comprises a lubricant base oil having a 10% distillation point of 400° C. or higher and a 80% distillation point of 600° C. or lower as measured by a gas chromatograph distillation method, a kinematic viscosity of 2 to 30 mm$^2$/s as measured at 100° C., and a viscosity index of 100 or more (e.g., refer to Japanese Patent Application Laid-open No. 294886/2001).

In Examples of the above Japanese Patent Application, it is described that the kinematic viscosity of the base oil used in the lubricant composition is in the range of from 17 to 70 mm$^2$/s as measured at 40° C.

The refrigerators using a refrigerating machine oil having such a high viscosity tend to inevitably suffer from a large energy consumption. Therefore, for the purpose of saving energy for the refrigerators, studies have been made to reduce a viscosity of the refrigerating machine oil and improve frictional properties upon the lubrication.

For example, in refrigerators for cold storage, an energy saving performance thereof has been improved by reducing a viscosity of the refrigerating machine oil used therein to VG32, 22, 15 and 10, respectively. However, when the viscosity of the refrigerating machine oil is further reduced, there tends to arise such a problem that a sealability and a lubricating property thereof are deteriorated.

SUMMARY OF THE INVENTION

The present invention has been made in view of the above conventional problems. An object of the present invention is to provide a refrigerating machine oil composition having a low viscosity, an improved energy-saving performance, a good sealability and an excellent compatibility with a refrigerant which are suitably used in various refrigerating application fields, in particular, closed-system refrigerators.

As a result of intensive and extensive researches to develop refrigerating machine oil compositions having the above suitable properties, the inventors have found that the objects of the present invention can be achieved by using a base oil containing a polyvinyl ether and/or a polyoxyalkylene glycol derivative having a specific low viscosity as a main component and by forming sliding portions of a refrigerator from a specific material. The present invention has been accomplished on the basis of the finding.

Thus, the present invention provides:

(1) A refrigerating machine oil composition comprising a base oil containing a polyvinyl ether and/or a polyoxyalkylene glycol derivative as a main component and having a kinematic viscosity of 1 to 8 mm²/s as measured at 40° C.;

(2) the refrigerating machine oil composition described in the above aspect (1), wherein said base oil has a molecular weight of 100 to 600;

(3) the refrigerating machine oil composition described in the above aspect (1), wherein said base oil has a flash point of 100° C. or higher;

(4) the refrigerating machine oil composition described in the above aspect (1), wherein said polyvinyl ether is a compound having a repeating unit represented by the general formula (I):

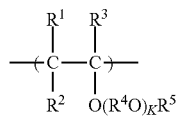

(I)

wherein $R^1$, $R^2$ and $R^3$ are respectively a hydrogen atom or a hydrocarbon group having 1 to 8 carbon atoms, and may be the same or different; $R^4$ is a divalent hydrocarbon group having 1 to 10 carbon atoms; $R^5$ is a hydrocarbon group having 1 to 20 carbon atoms; k is a number of 0 to 10 on average; $R^1$ to $R^5$ in one repeating unit may be respectively the same as or different from those in the other repeating units; and when k is 2 or more, a plurality of the $R^4O$ groups may be the same or different;

(5) the refrigerating machine oil composition described in the above aspect (1), wherein said polyoxyalkylene glycol derivative is a compound represented by the general formula (II):

(II)

wherein $R^6$ is a hydrogen atom, an alkyl group having 1 to 10 carbon atoms, an acyl group having 2 to 10 carbon atoms or an aliphatic hydrocarbon group having 1 to 10 carbon atoms which contains 2 to 6 bonding sites; $R^7$ is an alkylene group having 2 to 4 carbon atoms; $R^8$ is a hydrogen atom, an alkyl group having 1 to 10 carbon atoms or an acyl group having 2 to 10 carbon atoms; n is an integer of 1 to 6; and m is a number of more than 2 but not more than 20 on average;

(6) the refrigerating machine oil composition described in the above aspect (1) which further comprises at least one additive selected from the group consisting of an extreme pressure agent, an oiliness agent, an antioxidant, an acid scavenger and a defoaming agent;

(7) the refrigerating machine oil composition described in the above aspect (1), wherein said composition is applied to a refrigerator using a hydrocarbon-based, carbon dioxide-based, hydrofluorocarbon-based or ammonia-based refrigerant;

(8) the refrigerating machine oil composition described in the above aspect (7), wherein said composition is applied to a refrigerator using a hydrocarbon-based refrigerant;

(9) the refrigerating machine oil composition described in the above aspect (7), wherein the refrigerator includes a sliding portion which is made of an engineering plastic material, or provided thereon with an organic coating film or an inorganic coating film;

(10) the refrigerating machine oil composition described in the above aspect (9), wherein the organic coating film is a polytetrafluoroethylene coating film, a polyimide coating film or a polyamide imide coating film;

(11) the refrigerating machine oil composition described in the above aspect (9), wherein the inorganic coating film is a graphite film, a diamond-like carbon film, a tin film, a chromium film, a nickel film or a molybdenum film;

(12) the refrigerating machine oil composition described in the above aspect (1), wherein said composition is applied to various hot water supply systems or refrigerating and heating systems for air conditioners for automobiles, gas heat pumps, general-purpose air conditioning equipments, refrigerators, automatic vending machines or showcases; and

(13) the refrigerating machine oil composition described in the above aspect (12), wherein a water content in the systems is 60 ppm by mass or less, and a residual air content therein is 8 kPa or less.

EFFECT OF THE INVENTION

In accordance with the present invention, there is provided a refrigerating machine oil composition having a low viscosity, an improved energy saving performance, a good sealability and an excellent compatibility with a refrigerant which is suitably used in various refrigerating application fields, in particular, closed-system refrigerators.

DETAILED DESCRIPTION OF THE INVENTION

In the refrigerating machine oil composition of the present invention, there is used a base oil containing a polyvinyl ether and/or a polyoxyalkylene glycol derivative as a main component. The "polyvinyl ether and/or polyoxyalkylene glycol derivative contained as a main component of the base oil" used herein means that the base oil contains the polyvinyl ether and/or the polyoxyalkylene glycol derivative in an amount of 50% by mass or more. The content of the polyvinyl ether and/or the polyoxyalkylene glycol derivative in the base oil is preferably 70% by mass or more, more preferably 90% by mass or more and still more preferably 100% by mass.

The base oil used in the present invention has a kinematic viscosity of 1 to 8 mm²/s as measured at 40° C. When the base oil has a kinematic viscosity of 1 mm²/s or more, the resultant refrigerating machine oil composition can exhibit a good lubricating property as well as a good sealability, whereas when the base oil has a kinematic viscosity of 8 mm²/s or less, the resultant refrigerating machine oil composition can fully exhibit the effect of improving an energy saving performance. The kinematic viscosity of the base oil as measured at 40° C. is preferably from 1 to 5 mm²/s and more preferably from 2 to 4 mm²/s.

Also, the molecular weight of the base oil is preferably from 100 to 600, more preferably from 100 to 330 and still more preferably from 120 to 250. When the molecular weight of the base oil lies within the above-specified range, the base oil can exhibit a desired kinematic viscosity. The flash point of the base oil is preferably 100° C. or higher and more preferably 110° C. or higher.

In the present invention, as far as the base oil can exhibit the above properties, the composition may also contain, in addition to the polyvinyl ether and/or the polyoxyalkylene glycol derivative, any other base oils in an amount of 50% by mass or less, preferably 30% by mass or less and more preferably 10% by mass or less. However, the refrigerating machine oil composition of the present invention still more preferably contains no other base oils than the polyvinyl ether and/or the polyoxyalkylene glycol derivative.

Examples of the other base oils usable in combination with the polyvinyl ether and/or the polyoxyalkylene glycol derivative include hydrogenated α-olefin oligomers, ether compounds, mineral oils, alicyclic hydrocarbon compounds and alkylated aromatic hydrocarbon compounds.

The polyvinyl ether suitably used as a main component of the base oil in the present invention includes, for example, those polyvinyl ethers having a repeating unit represented by the general formula (I):

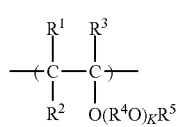

(I)

wherein $R^1$, $R^2$ and $R^3$ are respectively a hydrogen atom or a hydrocarbon group having 1 to 8 carbon atoms, and may be the same or different; $R^4$ is a divalent hydrocarbon group having 1 to 10 carbon atoms; $R^5$ is a hydrocarbon group having 1 to 20 carbon atoms; k is a number of 0 to 10 on average; $R^1$ to $R^5$ in one repeating unit may be respectively the same as or different from those in the other repeating units; and when k is 2 or more, a plurality of the $R^4O$ groups may be the same or different.

In the above general formula (I), $R^1$, $R^2$ and $R^3$ are respectively a hydrogen atom or a hydrocarbon group having 1 to 8 carbon atoms and preferably 1 to 4 carbon atoms, and may be the same or different. Specific examples of the hydrocarbon group include alkyl groups such as methyl, ethyl, n-propyl, isopropyl, n-butyl, isobutyl, sec-butyl, tert-butyl, various pentyl groups, various hexyl groups, various heptyl groups and various octyl groups; cycloalkyl groups such as cyclopentyl, cyclohexyl, various methylcyclohexyl groups, various ethylcyclohexyl groups and various dimethylcyclohexyl groups; aryl groups such as phenyl, various methylphenyl groups, various ethylphenyl groups and various dimethylphenyl groups; and arylalkyl groups such as benzyl, various phenylethyl groups and various methylbenzyl groups. Meanwhile, $R^1$, $R^2$ and $R^3$ are more preferably hydrogen atoms.

Also, in the above general formula (I), $R^4$ is a divalent hydrocarbon group having 1 to 10 carbon atoms and preferably 2 to 10 carbon atoms. Specific examples of the divalent hydrocarbon group having 1 to 10 carbon atoms include divalent aliphatic groups such as methylene, ethylene, phenylethylene, 1,2-propylene, 2-phenyl-1,2-propylene, 1,3-propylene, various butylene groups, various pentylene groups, various hexylene groups, various heptylene groups, various octylene groups, various nonylene groups and various decylene groups; alicyclic groups containing two bonding sites which are derived from alicyclic hydrocarbons such as cyclohexane, methyl cyclohexane, ethyl cyclohexane, dimethyl cyclohexane and propyl cyclohexane; divalent aromatic hydrocarbon groups such as various phenylene groups, various methylphenylene groups, various ethylphenylene groups, various dimethylphenylene groups and various naphthylene groups; alkyl aromatic groups derived from alkyl aromatic hydrocarbons such as toluene, xylene and ethyl benzene which contain an alkyl group moiety and an aromatic moiety respectively having a monovalent bonding site; and alkyl aromatic groups derived from polyalkyl aromatic hydrocarbons such as xylene and diethyl benzene which contain an alkyl group moiety having bonding sites. Among these divalent hydrocarbon groups, preferred are divalent aliphatic groups having 2 to 4 carbon atoms.

In the general formula (I), k represents a repeating number of $R^4O$ groups, and is a number ranging from 0 to 10 and preferably from 0 to 5 on the average. When k is 2 or more, a plurality of the $R^4O$ groups may be the same or different.

Further, in the general formula (I), $R^5$ is a hydrocarbon group having 1 to 20 carbon atoms and preferably 1 to 10 carbon atoms. Specific examples of the hydrocarbon group as $R^5$ include alkyl groups such as methyl, ethyl, n-propyl, isopropyl, n-butyl, isobutyl, sec-butyl, tert-butyl, various pentyl groups, various hexyl groups, various heptyl groups, various octyl groups, various nonyl groups and various decyl groups; cycloalkyl groups such as cyclopentyl, cyclohexyl, various methylcyclohexyl groups, various ethylcyclohexyl groups, various propylcyclohexyl groups and various dimethylcyclohexyl groups; aryl groups such as phenyl, various methylphenyl groups, various ethylphenyl groups, various dimethylphenyl groups, various propylphenyl groups, various trimethylphenyl groups, various butylphenyl groups and various naphthyl groups; and arylalkyl groups such as benzyl, various phenylethyl groups, various ethylbenzyl groups, various phenylpropyl groups and various phenylbutyl groups. Meanwhile, $R^1$ to $R^5$ in one repeating unit may be respectively the same as or different from those in the other repeating units.

The polyvinyl ether used in the present invention may be produced by polymerizing one or more kinds of corresponding vinyl ether monomers.

The details of these polyvinyl ethers are described in paragraphs [0027] to [0045] of Japanese Patent Application Laid-open No. 49282/2001.

Examples of the suitable polyvinyl ether include polyethyl vinyl ether and polyethyl vinyl ether-polyisobutyl vinyl ether copolymers.

The polyvinyl ether used in the present invention may be appropriately selected from those polyvinyl ethers having such a polymerization degree that the resultant base oil exhibits a kinematic viscosity of 1 to 8 mm²/s and preferably 1 to 4 mm²/s as measured at 40° C.

On the other hand, the polyoxyalkylene glycol derivative suitably used as a main component of the base oil in the present invention includes, for example, those compounds represented by the general formula (II):

(II)

wherein $R^6$ is a hydrogen atom, an alkyl group having 1 to 10 carbon atoms, an acyl group having 2 to 10 carbon atoms or an aliphatic hydrocarbon group having 1 to 10 carbon atoms which contains 2 to 6 bonding sites; $R^7$ is an alkylene group having 2 to 4 carbon atoms; $R^8$ is a hydrogen atom, an alkyl group having 1 to 10 carbon atoms or an acyl group having 2 to 10 carbon atoms; n is an integer of 1 to 6; and m is a number of more than 2 but not more than 20 on average.

In the above formula (II), the alkyl groups having 1 to 10 carbon atoms as $R^6$ and $R^8$ may be respectively either linear, branched or cyclic. Specific examples of the alkyl groups as $R^6$ and $R^8$ include methyl, ethyl, n-propyl, isopropyl, various butyl groups, various pentyl groups, various hexyl groups, various heptyl groups, various octyl groups, various nonyl groups, various decyl groups, cyclopentyl and cyclohexyl. When the alkyl groups as $R^6$ and $R^8$ have more than 10 carbon atoms, the polyoxyalkylene glycol derivative tends to be deteriorated in compatibility with a refrigerant, resulting in occurrence of undesirable phase separation. The alkyl groups as $R^6$ and $R^8$ preferably have 1 to 6 carbon atoms.

Also, the alkyl group moiety in the respective acyl groups having 2 to 10 carbon atoms as $R^6$ and $R^8$ may be either linear, branched or cyclic. Specific examples of the alkyl group moiety in the respective acyl groups as $R^6$ and $R^8$ include those alkyl groups having 1 to 9 carbon atoms as specifically exemplified above. When the acyl groups as $R^6$ and $R^8$ have more than 10 carbon atoms, the polyoxyalkylene glycol derivative tends to be deteriorated in compatibility with a refrigerant, resulting in occurrence of undesirable phase separation. The acyl groups as $R^6$ and $R^8$ preferably have 2 to 6 carbon atoms.

When both of $R^6$ and $R^8$ are alkyl groups or acyl groups, $R^6$ and $R^8$ may be the same or different.

In addition, when n is 2 or more, a plurality of the $R^8$ groups being present in one molecule may be the same or different.

When $R^6$ is an aliphatic hydrocarbon group having 1 to 10 carbon atoms which contains 2 to 6 bonding sites, the aliphatic hydrocarbon group may be chain-like or cyclic. Specific examples of the aliphatic hydrocarbon group containing two bonding sites include ethylene, propylene, butylene, pentylene, hexylene, heptylene, octylene, nonylene, decylene, cyclopentylene and cyclohexylene. Specific examples of the aliphatic hydrocarbon group containing 2 to 6 bonding sites include residual groups obtained by removing hydroxyl groups from polyhydric alcohols such as trimethylol propane, glycerol, pentaerythritol, sorbitol, 1,2,3-trihydroxycyclohexane and 1,3,5-trihydroxycyclohexane.

When the aliphatic hydrocarbon group as $R^6$ has more than 10 carbon atoms, the polyoxyalkylene glycol derivative tends to be deteriorated in compatibility with a refrigerant, resulting in occurrence of undesirable phase separation. The aliphatic hydrocarbon group as $R^6$ preferably has 2 to 6 carbon atoms.

In the present invention, at least one group of the above $R^6$ and $R^8$ is preferably an alkyl group, more preferably an alkyl group having 1 to 3 carbon atoms, and still more preferably methyl in view of viscosity characteristics of the composition. Further, for the same reason, both of $R^6$ and $R^8$ are preferably alkyl groups and more preferably methyl groups.

In the general formula (II), $R^7$ represents an alkylene group having 2 to 4 carbon atoms. Examples of the oxyalkylene group as the repeating unit include oxyethylene, oxypropylene and oxybutylene. A plurality of the oxyalkylene groups being present in one molecule may be identical to each other, or may include two or more kinds of oxyalkylene groups.

In the above general formula (II), n is an integer of 1 to 6, and may be determined according to the number of the bonding sites in $R^6$. For example, when $R^6$ is an alkyl group or an acyl group, n is 1, whereas when $R^6$ is an aliphatic hydrocarbon group having 2, 3, 4, 5 and 6 bonding sites, n is 2, 3, 4, 5 and 6, respectively. Also, m is a number of more than 2 but not more than 20 on average. When m is more than 20 on the average, the resultant composition tends to fail to fully achieve the aimed objects of the present invention.

The details of these polyoxyalkylene glycol derivatives are described in paragraphs [0012] to [0026] of Japanese Patent Application Laid-open No. 49282/2001.

Among these polyoxyalkylene glycol derivatives represented by the above general formula (II), preferred are polypropylene glycol dimethyl ether, polyethylene-polypropylene glycol copolymer dimethyl ether, polypropylene glycol monobutyl ether and polypropylene glycol diacetate.

The polyoxyalkylene glycol derivative used in the present invention may be appropriately selected from those compounds such that the resultant base oil has a kinematic viscosity of 1 to 8 mm$^2$/s and preferably 1 to 4 mm$^2$/s as measured at 40° C.

In the present invention, as the base oil, there may be used one kind of the above polyvinyl ether solely, combination of two or more kinds of the polyvinyl ethers, one kind of the above polyoxyalkylene glycol derivative solely, combination of two or more kinds of the polyoxyalkylene glycol derivatives, or combination of one or more kinds of the polyvinyl ethers and one or more kinds of the polyoxyalkylene glycol derivatives.

The refrigerating machine oil composition of the present invention may also contain at least one additive selected from the group consisting of an extreme pressure agent, an oiliness agent, an antioxidant, an acid scavenger and a defoaming agent.

Examples of the extreme pressure agent include phosphorus-based extreme pressure agents such as phosphates, acid phosphates, phosphites, acid phosphites and amine salts thereof.

Among these phosphorus-based extreme pressure agents, in view of a good extreme-pressure property and frictional properties, especially preferred are tricresyl phosphate, trithiophenyl phosphate, tri(nonylphenyl)phosphite, dioleyl hydrogen phosphite and 2-ethylhexyldiphenyl phosphite.

In addition, as the extreme pressure agent, there may also be used metal salts of carboxylic acids. The metal salts of carboxylic acids are preferably metals salts of carboxylic acids having 3 to 60 carbon atoms, more preferably metal salts of fatty acids having 3 to 30 carbon atoms, and still more preferably metal salts of fatty acids having 12 to 30 carbon atoms. Further examples of the extreme pressure agent include metal salts of dimer acids or trimer acids of these fatty acids as well as metal salts of dicarboxylic acids having 3 to 30 carbon atoms. Among these extreme pressure agents, preferred are metal salts of fatty acids having 12 to 30 carbon atoms and dicarboxylic acids having 3 to 30 carbon atoms.

Also, the metal element constituting the metal salts is preferably an alkali metal or an alkali earth metal and more preferably an alkali metal.

Examples of the other extreme pressure agents than those described above include sulfur-based extreme pressure agents such as sulfurized fats and oils, sulfurized fatty acids, sulfurized esters, sulfurized olefins, dihydrocarbyl polysulfide, thiocarbamates, thioterpenes and dialkylthiodipropionates.

The amount of the extreme pressure agent blended is usually from 0.001 to 5% by mass and preferably from 0.005 to 3% by mass on the basis of the total amount of the composition in view of lubricating property and stability.

These extreme pressure agents may be used alone or in combination of any two or more thereof.

Examples of the oiliness agent include aliphatic saturated or unsaturated monocarboxylic acids such as stearic acid and oleic acid, polymerized fatty acids such as dimer acids and hydrogenated dimer acids, hydroxy fatty acids such as ricinoleic acid and 12-hydroxystearic acid, aliphatic saturated or unsaturated monoalcohols such as lauryl alcohol and oleyl alcohol, aliphatic saturated or unsaturated monoamines such as stearyl amine and oleyl amine, aliphatic saturated or unsaturated monocarboxylic acid amides such as laurylamide and oleamide, and partial esters of a polyhydric alcohol such as glycerol and sorbitol with the aliphatic saturated or unsaturated monocarboxylic acid.

These oiliness agents may be used alone or in combination of any two or more thereof The amount of the oiliness agent blended is usually from 0.01 to 10% by mass and preferably from 0.1 to 5% by mass on the basis of the total amount of the composition.

Examples of the antioxidant include phenol-based antioxidants such as 2,6-di-tert-butyl-4-methyl phenol, 2,6-di-tert-butyl-4-ethyl phenol and 2,2'-methylenebis(4-methyl-6-tert-butyl phenol) and amine-based antioxidants such as phenyl-□-naphthyl amine and N,N'-diphenyl-p-phenylene diamine. The amount of the antioxidant blended is usually from 0.01 to 5% by mass and preferably from 0.05 to 3% by mass on the basis of the total amount of the composition in view of good effects and economical advantages.

Examples of the acid scavenger include phenyl glycidyl ether, alkyl glycidyl ether, alkylene glycol glycidyl ether, cyclohexeneoxide, □-olefinoxide and epoxy compounds such as epoxidated soybean oil. Among these acid scavengers, phenyl glycidyl ether, alkyl glycidyl ether, alkylene glycol glycidyl ether, cyclohexeneoxide and □-olefinoxide are preferred in view of a good compatibility.

The alkyl group contained in the alkyl glycidyl ether and the alkylene group contained in the alkylene glycol glycidyl ether may be branched or unbranched, and respectively have usually 3 to 30 carbon atoms, preferably 4 to 24 carbon atoms and more preferably 6 to 16 carbon atoms. In the present invention, these acid scavengers may be used alone or in combination of any two or more thereof The amount of the acid scavenger blended is usually from 0.005 to 5% by mass and preferably from 0.05 to 3% by mass on the basis of the total amount of the composition in view of good effects and prevention of formation of sludge.

In the present invention, the refrigerating machine oil composition can be improved in stability by blending the acid scavenger therein, and the stability of the refrigerating machine oil composition can be further improved by using the acid scavenger in combination with the extreme pressure agent and the antioxidant.

Examples of the defoaming agent include silicone oils and fluorinated silicone oils.

The refrigerating machine oil composition of the present invention may further contain various other known additives unless the addition thereof adversely affects the objects of the present invention. Examples of the other known additives include a steel deactivator such as N—[N,N'-dialkyl($C_3$ to $C_{12}$ alkyl)aminomethyl]tolutriazole.

The refrigerating machine oil composition of the present invention can be suitably applied to refrigerators using a hydrocarbon-based, carbon dioxide-based, hydrofluorocarbon-based or ammonia-based refrigerant, and in particular, to those refrigerators using a hydrocarbon-based refrigerant.

In the method of lubricating the refrigerators using the refrigerating machine oil composition of the present invention, various refrigerants and refrigerating machine oil compositions as described above may be used in such an amount that a mass ratio of the refrigerant to the refrigerating machine oil composition is from 99/1 to 10/90 and preferably from 95/5 to 30/70. When the amount of the refrigerant used is less than the above-specified range, the refrigerating performance tends to be deteriorated. When the amount of the refrigerant used is more than the above-specified range, the lubricating performance tends to be deteriorated. The refrigerating machine oil composition of the present invention can be applied to various refrigerators, in particular, can be suitably used in a compression refrigerating cycle of compression-type refrigerators.

The refrigerators to which the refrigerating machine oil composition of the present invention is applied has a refrigerating cycle essentially constituted from a compressor, a condenser, an expansion system (such as expansion valve) and an evaporator, or a compressor, a condenser, an expansion system, a dryer and an evaporator. In the refrigerators, there may be used the refrigerating machine oil composition of the present invention as a refrigerating machine oil as well as various refrigerants as described above.

The dryer is preferably filled with a drying agent made of zeolite having a pore diameter of 0.33 nm or less. Examples of the zeolite include natural zeolites and synthetic zeolites. The zeolite more preferably exhibits a $CO_2$ gas absorption capacity of 1.0% or less as measured at 25° C. under a $CO_2$ gas partial pressure of 33 kPa. Specific examples of the synthetic zeolite having such an absorption capacity include those available under tradenames "XH-9", "XH-600", etc., from Union Showa Co., Ltd.

In the present invention, when using such a drying agent, water is efficiently removed from the refrigerating cycle without absorbing the refrigerant present in the refrigerating cycle. At the same time, since such a drying agent is prevented by itself from being powdered owing to deterioration thereof, there can be avoided occurrence of clogging of conduits with the powder or abnormal wear due to intrusion of the powder into sliding portions of the compressor. As a result, the refrigerators can be stably operated for a long period of time.

In the refrigerators to which the refrigerating machine oil composition of the present invention is applied, various sliding portions (for example, bearings) are provided within the compressor thereof. In the present invention, these sliding portions are preferably made of an engineering plastic material, or provided thereon with an organic coating film or an inorganic coating film, in particular, in view of a good sealability.

Examples of the preferred engineering plastic material include polyamide resins, polyphenylene sulfide resins and polyacetal resins in view of good sealability, slidability and abrasion resistance.

Examples of the organic coating film include a fluorine-containing resin coating film (such as a polytetrafluoroethylene coating film), a polyimide coating film and a polyamide imide coating film in view of good sealability, slidability and abrasion resistance.

Examples of the inorganic coating film include a graphite film, a diamond-like carbon film, a nickel film, a molybdenum film, a tin film and a chromium film in view of good sealability, slidability and abrasion resistance. These inorganic coating films may be formed by either plating treatment or PVD (physical vapor deposition) method.

In addition, the sliding portions may be made of a conventional alloy material such as, for example, Fe-based alloys, Al-based alloys and Cu-based alloys.

The refrigerating machine oil composition of the present invention may be suitably used in various hot water supply systems or refrigerating and heating systems for air conditioners for automobiles, gas heat pumps, general-purpose air conditioning equipments, refrigerators, automatic vending machines or showcases.

In the present invention, the water content in these systems is preferably 60 ppm by mass or less and more preferably 50 ppm by mass or less. The residual air content in the systems is preferably 8 kPa or less and more preferably 7 kPa or less.

The refrigerating machine oil composition of the present invention is composed of a base oil containing a polyvinyl ether and/or a polyoxyalkylene glycol derivative as a main component thereof, and can exhibit a low viscosity, an improved energy saving performance and an excellent compatibility with a refrigerant.

EXAMPLES

The present invention will be described in more detail by referring to the following examples. However, it should be noted that these examples are only illustrative and not intended to limit the invention thereto. Meanwhile, various properties of the base oil as well as the refrigerating machine oil composition were measured by the following methods.

<Properties of Base Oil>

(1) 40° C. Kinematic Viscosity

Measured using a glass capillary viscometer according to JIS K2283-1983.

(2) Flash Point

Measured by C.O.C. method according to JIS K2265.

<Properties of Refrigerating Machine Oil Composition>

(3) Solubility of Refrigerant in Refrigerating Machine Oil Composition

A saturation solubility of isobutane in the refrigerating machine oil composition was measured at 20° C. under 0.2 MPa using a solubility measuring apparatus. The mass percent as the saturation solubility of isobutane was the value obtained by measuring an amount of isobutane contained in an oil layer sampled.

(4) Sealed Tube Test

The catalyst composed of Fe, Cu and Al was charged into a glass tube. Further, a sample oil and a refrigerant (isobutane) were filled into the glass tube in such an amount that a ratio of the sample oil to the refrigerant was 4 mL/1 g, and then the glass tube was sealed. The contents in the glass tube were allowed to stand at 175° C. for 30 days, and then observed to evaluate or determine an appearance of each of the oil and the catalyst, occurrence or non-occurrence of sludge therein, and an acid value thereof.

(5) Short Circuit Test

Using a short circuit tester (reciprocating-type refrigerator; capillary length: 1 m), the 1000 h endurance test was conducted under the following conditions to measure a rate of decease in capillary flow amount after the test:

Discharge pressure $P_d$/suction pressure $P_s$:3.3 MPa/0.4 MPa; discharge-side temperature $T_d$/suction-side temperature $T_s$:110° C./30° C.; and sample oil amount/refrigerant ("R600a":isobutane) amount:400 g/400 g.

(6) Sealability Comparison Test

Using various sliding members as a piston, blow-by gas amounts discharged from a clearance between the piston and cylinder were compared with each other. The respective blow-by gas amounts were expressed by a relative value calculated assuming that the blow-by gas amount obtained in Reference Example 2 was regarded as 25.

Examples 1 to 12 and Comparative Examples 1 to 3

The refrigerating machine oils and the refrigerating machine oil compositions as shown in Table 1 were prepared, and subjected to measurement for a solubility of the refrigerant therein as well as the sealed tube test. The result are shown in Table 1.

TABLE 1

|  | Examples | | | | | |
| --- | --- | --- | --- | --- | --- | --- |
|  | 1 | 2 | 3 | 4 | 5 | 6 |
|  | Sample oil No. | | | | | |
|  | 1 | 2 | 3 | 4 | 5 | 6 |
| Content (% by mass) | | | | | | |
| Base oil A1 | 100 | | | 97.5 | | |
| Base oil A2 | | 100 | | | 97.5 | |
| Base oil A3 | | | 100 | | | 97.5 |
| Base oil B1 | | | | | | |
| Base oil B2 | | | | | | |
| Extreme pressure agent C1 | | | | 1 | 1 | 1 |
| Extreme pressure agent C2 | | | | | | |
| Acid scavenger C3 | | | | 1 | 1 | 1 |
| Antioxidant C4 | | | | 0.5 | 0.5 | 0.5 |
| Defoaming agent C5 | | | | 0.001 | 0.001 | 0.001 |
| Solubility of refrigerant (% by mass) | 30 | 32 | 35 | — | — | — |
| Results of sealed tube test | | | | | | |
| Appearance of oil | Good | Good | Good | Good | Good | Good |
| Appearance of catalyst | Good | Good | Good | Good | Good | Good |
| Occurrence of sludge | None | None | None | None | None | None |
| Acid value (mg KOH/g) | 0.01> | 0.01> | 0.01> | 0.01> | 0.01> | 0.01> |
| Appearance at −10° C. | Liquid | Liquid | Liquid | Liquid | Liquid | Liquid |

|  | Examples | | | | | |
| --- | --- | --- | --- | --- | --- | --- |
|  | 7 | 8 | 9 | 10 | 11 | 12 |
|  | Sample oil No. | | | | | |
|  | 7 | 8 | 9 | 10 | 11 | 12 |
| Content (% by mass) | | | | | | |
| Base oil A1 | 97.5 | | | 98.0 | | |
| Base oil A2 | | 97.5 | | | 98.0 | |
| Base oil A3 | | | 97.5 | | | 98.0 |
| Base oil B1 | | | | | | |
| Base oil B2 | | | | | | |

TABLE 1-continued

|  |  |  |  |  |  |  |
|---|---|---|---|---|---|---|
| Extreme pressure agent C1 |  |  |  | 0.5 | 0.5 |  |
| Extreme pressure agent C2 | 1 | 1 | 1 |  |  | 0.5 |
| Acid scavenger C3 | 1 | 1 | 1 | 1 | 1 | 1 |
| Antioxidant C4 | 0.5 | 0.5 | 0.5 | 0.5 | 0.5 | 0.5 |
| Defoaming agent C5 | 0.001 | 0.001 | 0.001 | 0.001 | 0.001 | 0.001 |
| Solubility of refrigerant (% by mass) | — | — | — | — | — | — |
| Results of sealed tube test |  |  |  |  |  |  |
| Appearance of oil | Good | Good | Good | Good | Good | Good |
| Appearance of catalyst | Good | Good | Good | Good | Good | Good |
| Occurrence of sludge | None | None | None | None | None | None |
| Acid value (mg KOH/g) | 0.01> | 0.01> | 0.01> | 0.01> | 0.01> | 0.01> |
| Appearance at −10° C. | Liquid | Liquid | Liquid | Liquid | Liquid | Liquid |

|  | Comparative Examples | | |
|---|---|---|---|
|  | 1 | 2 | 3 |
|  | Sample oil No. | | |
|  | 13 | 14 | 15 |
| Content (% by mass) |  |  |  |
| Base oil A1 |  |  |  |
| Base oil A2 |  |  |  |
| Base oil A3 |  |  |  |
| Base oil B1 | 97.5 | 100.0 |  |
| Base oil B2 |  |  | 98.0 |
| Extreme pressure agent C1 | 1 |  | 0.5 |
| Extreme pressure agent C2 |  |  |  |
| Acid scavenger C3 | 1 |  | 1 |
| Antioxidant C4 | 0.5 |  | 0.5 |
| Defoaming agent C5 | 0.001 |  | 0.001 |
| Solubility of refrigerant (% by mass) | — | 5 | 21 |
| Results of sealed tube test |  |  |  |
| Appearance of oil | Good | Good | Good |
| Appearance of catalyst | Good | Good | Good |
| Occurrence of sludge | None | None | None |
| Acid value (mg KOH/g) | 0.01> | 0.01> | 0.01> |
| Appearance at −10° C. | Liquid | Liquid | Solid |

Note:

A1: Polypropylene glycol dimethyl ether; 40° C. kinematic viscosity: 3.2 mm$^2$/s; flash point: 125° C.; molecular weight: 196

A2: Polypropylene glycol monobutyl ether; 40° C. kinematic viscosity: 3.1 mm$^2$/s; flash point: 110° C.; molecular weight: 154

A3: Polyethyl vinyl ether; 40° C. kinematic viscosity: 3.1 mm$^2$/s; flash point: 122° C.; molecular weight: 182

B1: Silicone oil; 40° C. kinematic viscosity: 10 mm$^2$/s

B2: n-Hexadecane

C1: Tricresyl phosphate

C2: Trithiophenyl phosphate

C3: $C_{14}$ α-olefinoxide

C4: 2,6-di-t-butyl-4-methylphenol

C5: Silicone-based defoaming agent

From Table 1, it was confirmed that the refrigerating machine oils obtained in Examples 1 to 3 according to the present invention exhibited a good solubility of the refrigerant (isobutane) therein, whereas the refrigerating machine oils obtained in Comparative Examples 2 and 3 had a poor solubility of the refrigerant therein. In addition, the refrigerating machine oils and the refrigerating machine oil compositions obtained in Examples 1 to 12 all exhibited good results of the sealed tube test.

Examples 13 to 21 and Comparative Examples 4 to 6

The sample oils as shown in Table 2 were subjected to the short circuit test. The result are shown in Table 2.

TABLE 2

|  | Examples | | | | | |
| --- | --- | --- | --- | --- | --- | --- |
|  | 13 | 14 | 15 | 16 | 17 | 18 |
|  | | | Sample oil No. | | | |
|  | 4 | 5 | 6 | 7 | 8 | 9 |
| Conditions of short circuit test | | | | | | |
| Water content in system (ppm) | 30 | 30 | 30 | 50 | 50 | 30 |
| Residual air (kPa) | 4 | 4 | 4 | 4 | 6.7 | 6.7 |
| Results of short circuit test | | | | | | |
| Rate of decrease in capillary flow amount | 3> | 3> | 3> | 3> | 3> | 3> |
| Appearance of oil | Good | Good | Good | Good | Good | Good |
| Acid value (mg KOH/g) | 0.01> | 0.01> | 0.01> | 0.01> | 0.01> | 0.01> |
| Remarks | | | | | | |

|  | Examples | | | Comparative Examples | | |
| --- | --- | --- | --- | --- | --- | --- |
|  | 19 | 20 | 21 | 4 | 5 | 6 |
|  | | | Sample oil No. | | | |
|  | 1 | 2 | 3 | 13 | 14 | 15 |
| Conditions of short circuit test | | | | | | |
| Water content in system (ppm) | 30 | 200 | 500 | 30 | 30 | 30 |
| Residual air (kPa) | 27 | 4 | 67 | 4 | 4 | 4 |
| Results of short circuit test | | | | | | |
| Rate of decrease in capillary flow amount | 7 | 6 | 11 | — | — | — |
| Appearance of oil | Yellowish brown | Yellowish brown | Brown | — | — | — |
| Acid value (mg KOH/g) | 0.08 | 0.04 | 0.17 | — | — | — |
| Remarks | | | | Comp. seized | Comp. seized | Capillary clogged |

From Table 2, it was confirmed that the refrigerating machine oil compositions obtained in Examples 13 to 18 exhibited a water content in system of less than 60 ppm by mass and a residual air content of less than 8 kPa and, therefore, showed good results of the short circuit test.

On the other hand, the refrigerating machine oil compositions obtained in Examples 19 to 21 exhibited either a water content in system of more than 60 ppm by mass or a residual air content of more than 8 kPa. Therefore, results of the short circuit test obtained in Examples 19 to 21 were slightly deteriorated as compared to those obtained in Examples 13 to 18.

Also, the refrigerating machine oil compositions obtained in Comparative Examples 4 to 6 suffered from seizing of the compressor or clogging of the capillary when subjected to the short circuit test.

Examples 22 to 25 and Reference Examples 1 and 2

Using the sample oils as shown in Table 3, the sliding members as shown in Table 3 were subjected to the sealability comparison test. The result are shown in Table 3.

TABLE 3

|  | Examples | | | | Reference Examples | |
| --- | --- | --- | --- | --- | --- | --- |
|  | 22 | 23 | 24 | 25 | 1 | 2 |
| Sample oil No. | 4 | 5 | 6 | 6 | 6 | 6 |
| Sliding member | D1 | D2 | D3 | D4 | D5 | D6 |

TABLE 3-continued

|  | Examples | | | | Reference Examples | |
| --- | --- | --- | --- | --- | --- | --- |
|  | 22 | 23 | 24 | 25 | 1 | 2 |
| Blow-by gas amount (relative amount) | 9 | 7 | 8 | 12 | 17 | 25 |

Note:
D1: Polyphenylene sulfide
D2: Fluorine-containing polymer coating film
D3: Polyamide-containing coating film
D4: Tin-plated film
D5: Aluminum alloy
D6: Iron alloy From Table 3, it was confirmed that the refrigerating machine oil compositions obtained in Examples 22 to 25 all exhibited a small blow-by gas amount and, therefore, a good sealability as compared to those obtained in Reference Examples 1 and 2.

INDUSTRIAL APPLICABILITY

The refrigerating machine oil composition of the present invention has a low viscosity, an improved energy saving performance, a good sealability and an excellent compatibility with a refrigerant and, therefore, can be suitably used in various refrigerating application fields, in particular, in closed-system refrigerators.

What is claimed is:

1. A process for lubricating a refrigerator, comprising:
contacting moving parts of the refrigerator with a refrigerating machine oil; wherein the refrigerating machine oil comprises:
a base oil comprising as a main component, at least one of:
a polyvinyl ether, having a repeating unit of formula (I):

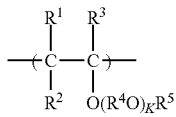

wherein $R^1$, $R^2$ and $R^3$ are respectively a hydrogen atom or a hydrocarbon group having 1 to 8 carbon atoms, and may be the same or different; $R^4$ is a divalent hydrocarbon group having 1 to 10 carbon atoms; $R^5$ is a hydrocarbon group having 1 to 20 carbon atoms; k is a number of 0 to 10 on average; $R^1$ to $R^5$ in one repeating unit may be respectively the same as or different from those in the other repeating units; and when k is 2 or more, a plurality of the $R^{4O}$ groups may be the same or different, and
a polyoxyalkylene glycol derivative of formula (II):

wherein $R^6$ is a hydrogen atom, an alkyl group having 1 to 10 carbon atoms, an acyl group having 2 to 10 carbon atoms or an aliphatic hydrocarbon group having 1 to 10 carbon atoms which contain 2 to 6 bonding sites; $R^7$ is an alkylene group having 2 to 4 carbon atoms; $R^8$ is a hydrogen atom, an alkyl group having 1 to 10 carbon atoms or an acyl group having 2 to 10 carbon atoms; n is an integer of 1 to 6; and m is a number of more than 2 but not more than 20 on average;

wherein
the refrigerator comprises a hydrocarbon based refrigerant,
a kinematic viscosity of the refrigerating machine oil is 1 to 8 mm²/s as measured at 40° C., and
the refrigerator comprises a sliding portion which is made of an engineering plastic material, or provided thereon with an organic coating film.

2. The process for lubricating a refrigerator according to claim 1, wherein the sliding portion is provided with an organic coating film and the organic coating film is a polytetrafluoroethylene coating film, a polyimide coating film or a polyamide imide coating film.

3. The process for lubricating a refrigerator according to claim 1, wherein the refrigerator is employed in a system selected from the group consisting of hot water supply systems, refrigerating and heating systems for air conditioners for automobiles, gas heat pumps, general-purpose air conditioning equipments, refrigerators, automatic vending machines and showcases.

4. The process for lubricating a refrigerator according to claim 3, wherein
a water content of the system is 60 ppm by mass or less and a residual air content of the system is 8 kPa or less.

5. The process for lubricating a refrigerator according to claim 1, wherein a molecular weight of the base oil of the refrigerating machine oil composition is from 100 to 600.

6. The process for lubricating a refrigerator according to claim 1, wherein a flash point of the base oil of the refrigerating machine oil composition is 100° C. or higher.

7. The process for lubricating a refrigerator according to claim 1, wherein the base oil comprises as a main component, a polyoxyalkylene glycol derivative of formula (II) and at least one of $R^6$ and $R^8$ is an alkyl group.

8. The process for lubricating a refrigerator according to claim 7, wherein $R^6$ and $R^8$ are each an alkyl group.

9. The process for lubricating a refrigerator according to claim 8, wherein $R^6$ and $R^8$ are each a methyl group.

10. The process for lubricating a refrigerator according to claim 1, wherein the refrigerating oil composition further comprises at least one additive selected from the group consisting of an extreme pressure agent, an oiliness agent, an antioxidant, an acid scavenger and a defoaming agent.

11. The process for lubricating a refrigerator according to claim 1, wherein an amount of the main component in the base oil is 50% by mass or more.

12. The process for lubricating a refrigerator according to claim 1, wherein an amount of the main component in the base oil is 100% by mass.

* * * * *